United States Patent [19]

Ikeda

[11] Patent Number: 5,003,524
[45] Date of Patent: Mar. 26, 1991

[54] OPTICAL DISK DRIVE WITH AN ACCURATELY POSITIONED OBJECTIVE LENS

[75] Inventor: Hidetoshi Ikeda, Yokohama, Japan

[73] Assignee: Kabushiki Kaisha Toshiba, Kawasaki, Japan

[21] Appl. No.: 289,349

[22] Filed: Dec. 23, 1988

[30] Foreign Application Priority Data

Dec. 26, 1987 [JP] Japan .................. 62-330491
Dec. 28, 1987 [JP] Japan .................. 62-330079

[51] Int. Cl.$^5$ .............................................. G11B 7/00
[52] U.S. Cl. ............................... 369/44.28; 369/44.32; 360/78.05
[58] Field of Search ................. 360/78.01, 78.04, 78.05, 360/78.06, 78.12, 78.13; 369/44.32, 44.28, 44.34, 32, 33, 44.11

[56] References Cited

U.S. PATENT DOCUMENTS

| | | | |
|---|---|---|---|
| 4,037,252 | 7/1977 | Johanne et al. ................. | 369/46 |
| 4,239,942 | 12/1980 | Van Alem et al. .............. | 369/43 |
| 4,513,406 | 4/1985 | Ishihara ........................... | 369/32 |
| 4,615,023 | 9/1986 | Inada et al. ..................... | 369/32 |
| 4,684,797 | 8/1987 | Ando et al. ..................... | 250/201.5 |
| 4,736,353 | 4/1988 | Kasai et al. ..................... | 369/32 |
| 4,769,803 | 9/1988 | Yamamiya ....................... | 369/44.16 |
| 4,775,903 | 10/1988 | Knowles ......................... | 360/77.04 X |

FOREIGN PATENT DOCUMENTS

| | | |
|---|---|---|
| 0098076 | 6/1983 | European Pat. Off. . |
| 3608269 | 3/1986 | Fed. Rep. of Germany . |
| 2505074 | 4/1982 | France . |
| 2029051 | 8/1979 | United Kingdom . |

OTHER PUBLICATIONS

Proceedings of SPIE, vol. 421, Jun. 1983, pp. 136–142; Inada et al.; "Tracking Servo System with New Optical Head Locked Objective Lens", p. 137, line 36—p. 139, line 9; FIGS. 2, 6, 7.

Primary Examiner—Robert L. Richardson
Attorney, Agent, or Firm—Finnegan, Henderson, Farabow, Garrett, and Dunner

[57] ABSTRACT

An optical disk apparatus for reading and writing information on an optical disk having concentric tracks. The objective lens is accurately positioned in both a tracking mode and a coarse access mode. During the tracking mode, a tracking detector detects a light beam reflected off of the optical disk and generates a tracking error signal. During the coarse access mode, a position detector detects the position of the objective lens and generates a position signal. The position signal generated when the objective lens is in an initial position is stored, and the stored signal is compared with the signals generated during the coarse accessing mode to produce a signal which represents the difference between the initial position of the objective lens and the current position of the objective lens. A coil is operated to move the objective lens in both the tracking mode and the coarse accessing mode. During the tracking mode, the objective lens follows a track on the optical disk, and during the coarse accessing mode, the objective lens is held in the initial position.

6 Claims, 8 Drawing Sheets

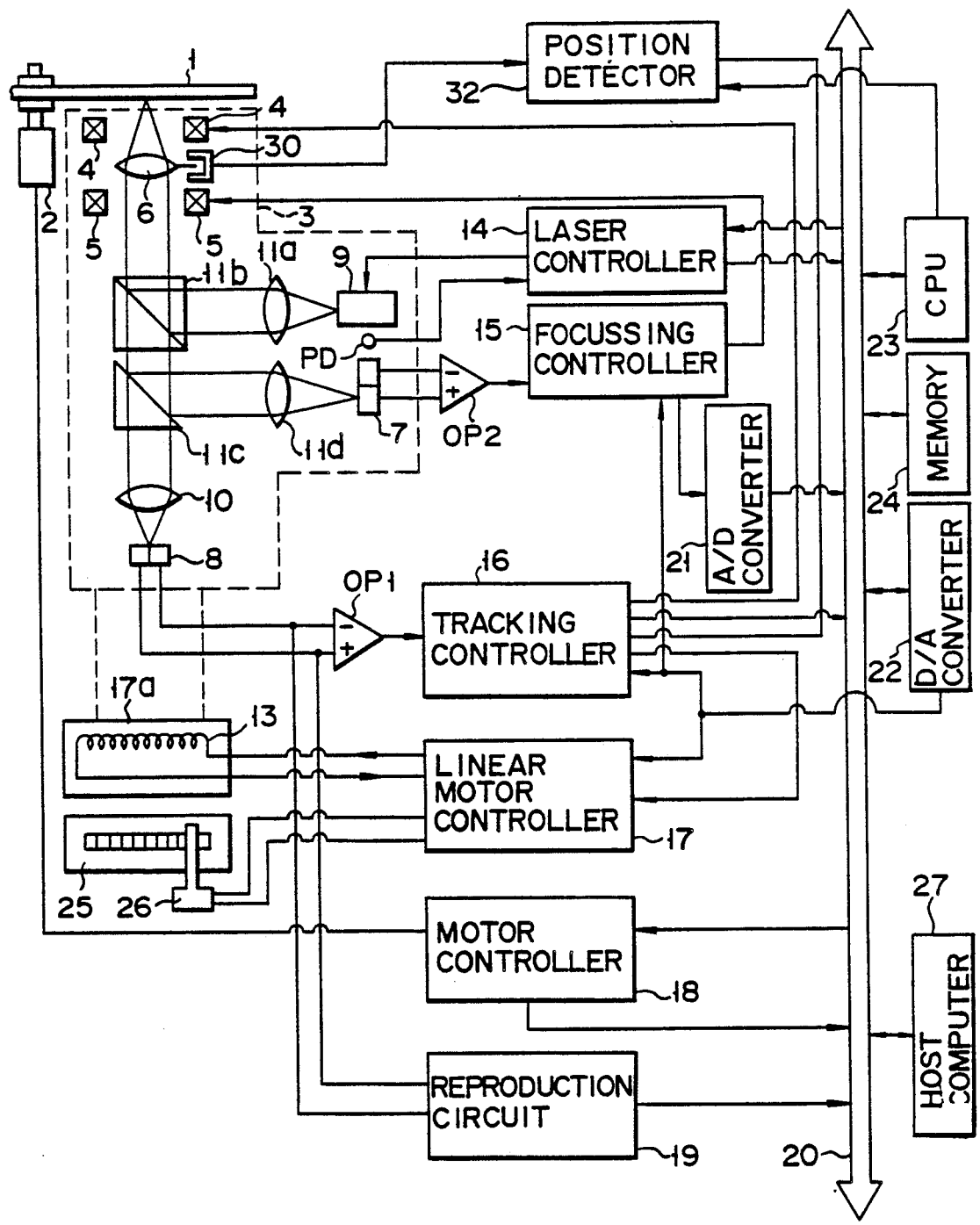
F I G. 1

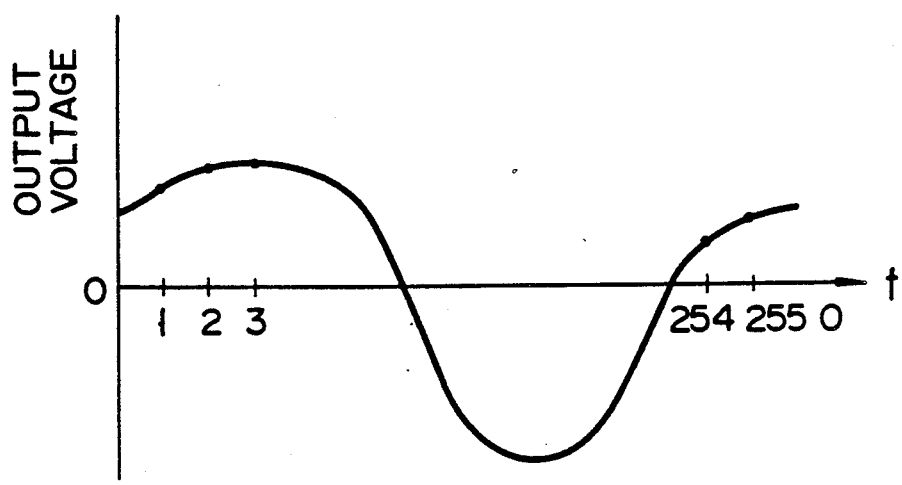
F I G. 8
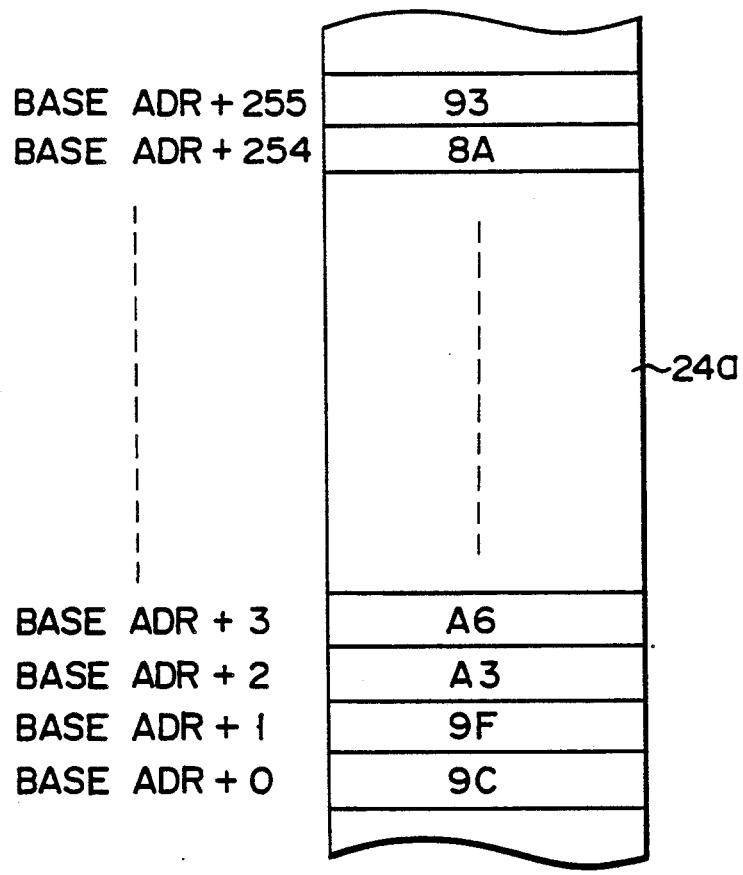
F I G. 9

OPTICAL DISK DRIVE WITH AN ACCURATELY POSITIONED OBJECTIVE LENS

Background of the Invention

1. Field of the Invention

The present invention generally relates to an optical disk apparatus, and, more particularly, to an optical disk apparatus which rotates a memory disk relative to an optical head so as to optically record data on, or reproduce data from, the memory disk.

2. Description of the Related Art

In an optical head arranged near one surface of a rotating optical disk, a laser beam generated by a semiconductor laser is converged on the optical disk by an objective lens for data recording or data reproduction. The optical head is subjected to tracking control so that the converged laser beam follows the tracks on the optical disk, or it is subjected to focus control so that the laser beam is focused on a target track on the optical disk by the objective lens.

The optical disk apparatus comprises a linear motor for moving the optical head in the radial direction of an optical disk in coarse access mode and an objective lens moving mechanism for driving the objective lens in fine access mode, as described in U.S. Pat. No. 4,037,252.

In accessing a desired or target track on an optical disk with a focused laser beam, first, the linear motor is operated in coarse access mode to move the optical head for coarse accessing to the target track. Then, the track position on the optical disk is read out by the laser beam, and, if the difference between the read track and the target track is small and within an allowable range, the mode is changed to the fine access mode from the coarse access mode. In fine access mode, the objective lens is moved to finely access the track. If the difference between the read and target tracks is large, the coarse access mode is maintained and the linear motor is again driven in this mode for coarse track accessing.

In coarse access mode, an optical scale provided at the optical head is read by a position detector so that the position and displacement of the scale are measured.

The irradiation position of the laser beam converged on the optical disk depends on the position of the optical head moved by the linear motor and the position of the objective lens provided in the optical head. Even if the linear motor is accurately moved over the distance to the target track in coarse access mode, the reaction to the acceleration or deceleration of the linear motor would move the objective lens in the optical head to significantly deviate the position of the lens from where it was before the accessing action. This reduces the accessing accuracy and makes high-speed access difficult.

The objective lens is generally provided at one end of a wire suspension and the other end of the suspension wire is secured to a fixed section. The objective lens is, thus, movably suspended. Therefore, the acceleration or deceleration force of the linear motor is likely to swing the objective lens. If the tracking control starts before the swinging of the lens stops, in order to realize high-speed accessing, the position of the objective lens after the coarse accessing carried out by the linear motor would be significantly deviated from the position of the lens before this accessing action.

As a result, in coarse access mode, the swinging of the objective lens reduces the access accuracy and prevents stable tracking, thus requiring a longer accessing time.

SUMMARY OF THE INVENTION

Accordingly, it is an object of this invention to provide an optical disk apparatus which suppresses the swinging of the objective lens in coarse access mode to improve the accessing accuracy in this mode, ensures stable tracking for higher accessing accuracy, and shorten the required access time.

It is another object of this invention to provide an optical disk apparatus which suppresses the swinging of the objective lens in coarse access mode to improve the accessing accuracy in this mode in consideration of eccentric compensation, ensures stable tracking at the proper position for higher accessing accuracy, and shortens the required access time.

According to one aspect of this invention to achieve the first object, there is provided an optical disk apparatus which comprises:

means for directing the light beam onto the optical disk, said directing means having converging means for converging the light beam onto said optical disk, which is movably supported therein;

means for transferring said directing means in a radial direction of said optical disk; and means for preventing said converging means from being moved with respect to said directing means when said directing means is transferred by said transferring means.

According to another aspect of this invention to achieve the second object, there is provided an optical disk apparatus which comprises:

means for rotating the optical disk;

means for directing the light beam onto the optical disk rotated by said rotating means, said directing means having converging means for converging the light beam onto said optical disk, which is movably supported therein;

means for transferring said directing means in a radial direction of the optical disk rotated by said rotating means;

means for storing compensation data corresponding to an eccentricity which is produced due to the rotation of the optical disk;

means for reading out the compensation data from said storing means; and means, responsive to the compensation data read out from said reading means, for adjusting the position of said moving means in said directing means when said directing means is transferred by said transferring means.

BRIEF DESCRIPTION OF THE DRAWINGS

FIG. 1 is a block diagram schematically illustrating an optical disk apparatus according to one embodiment of this invention;

FIG. 8 is a diagram illustrating the amount of deviation for each sector on an optical disk shown in FIG. 6;

FIG. 9 is a diagram illustrating an eccentric compensation table stored in a memory shown in FIG. 6.

DETAILED DESCRIPTION OF THE PREFERRED EMBODIMENTS

FIG. 1 schematically illustrates an optical disk apparatus according to one embodiment of this invention.

An optical disk 1 shown in FIG. 1 has grooves (tracks) formed in spiral or concentrically on its surface, and optical disk 1 is rotated at, for example, a constant speed by a motor 2 that is controlled by a motor controller 18.

Optical disk 1 comprises a disk-shaped substrate of, for example, glass or plastic, and a recording layer which is coated on the substrate.

Figure 2:
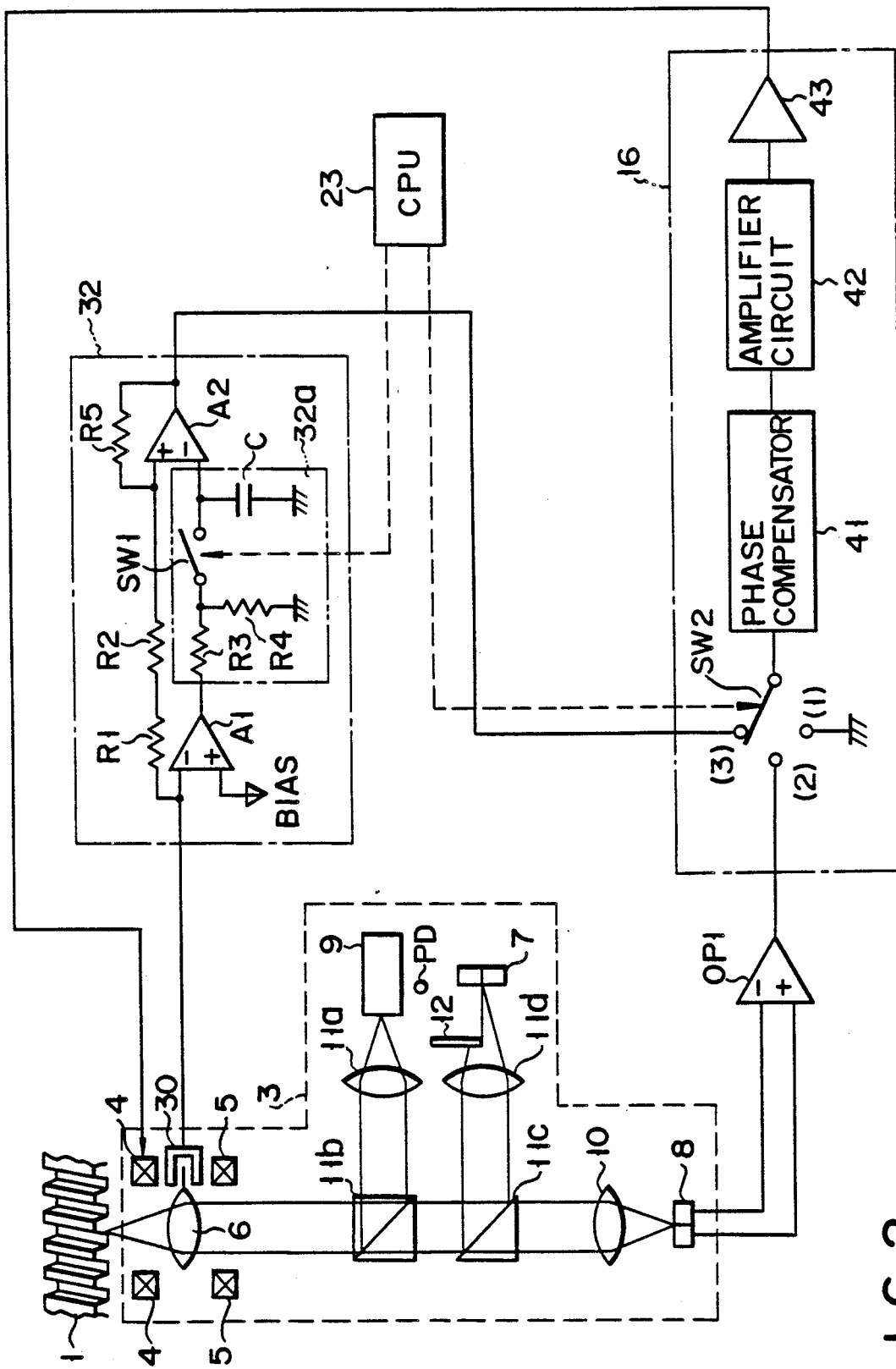
FIG. 2 is a diagram illustrating an essential section for suppressing the swinging of an objective lens in rough access mode.

Close under optical disk 1 is disposed an optical head 3. As disclosed in U.S. Pat. No. 4,684,797 (Ando et al.), this optical head 3 comprises, as shown in FIG. 2, an objective lens 6, drive coils 4 and 5 for driving the objective lens 6, a pair of focus sensors 7, a pair of track sensors 8, a semiconductor laser 9, a focusing lens 10, a collimator lens 11a, half prisms 11b and 11c, a knife edge 12 and a photosensor PD. (See U.S. Pat. No. 4,684,797 for the detail description of the optical system.)

Figure 3:
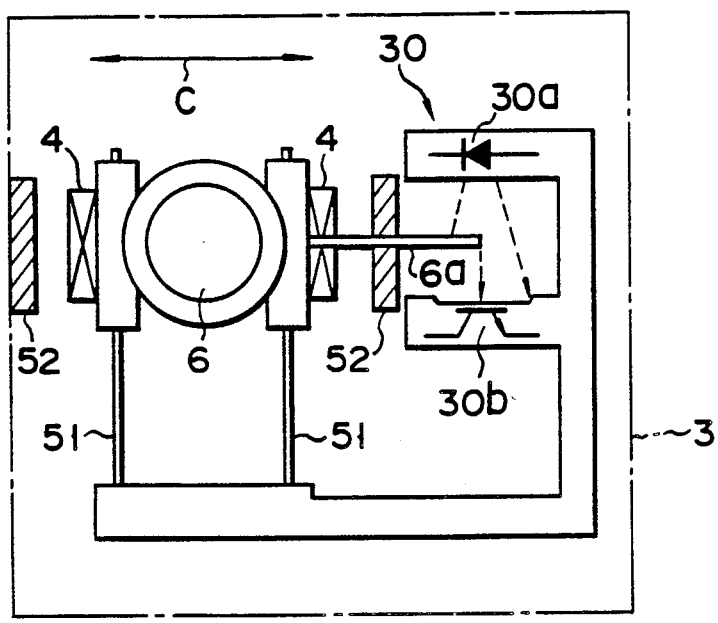
FIG. 3 is a schematic plan view illustrating the structure of an optical head shown in FIG. 1.

Objective lens 6 is suspended from a fixed section (not shown) by wire suspensions 51 as shown in FIG. 2 3. Objective lens 6, when driven by drive coil 5, is movable in the focusing direction (i.e., in the direction of the optical axis of the lens), and it is movable in the tracking direction (perpendicular to the optical axis of the lens) when driven by drive coil 4.

Figure 5:
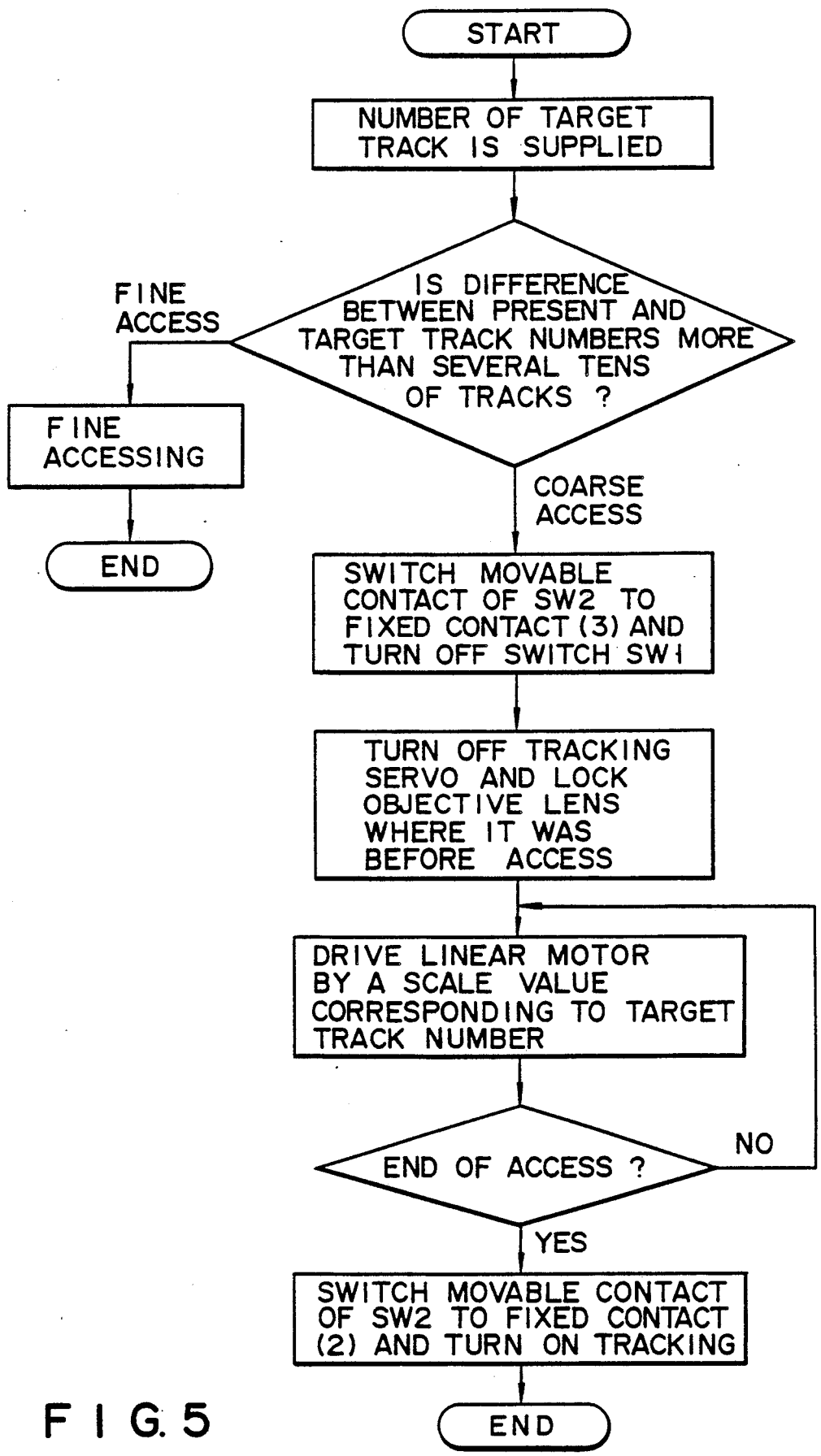
FIG. 5 is a flowchart for explaining the operation of the optical disk apparatus shown in FIG. 1.
Figure 6:
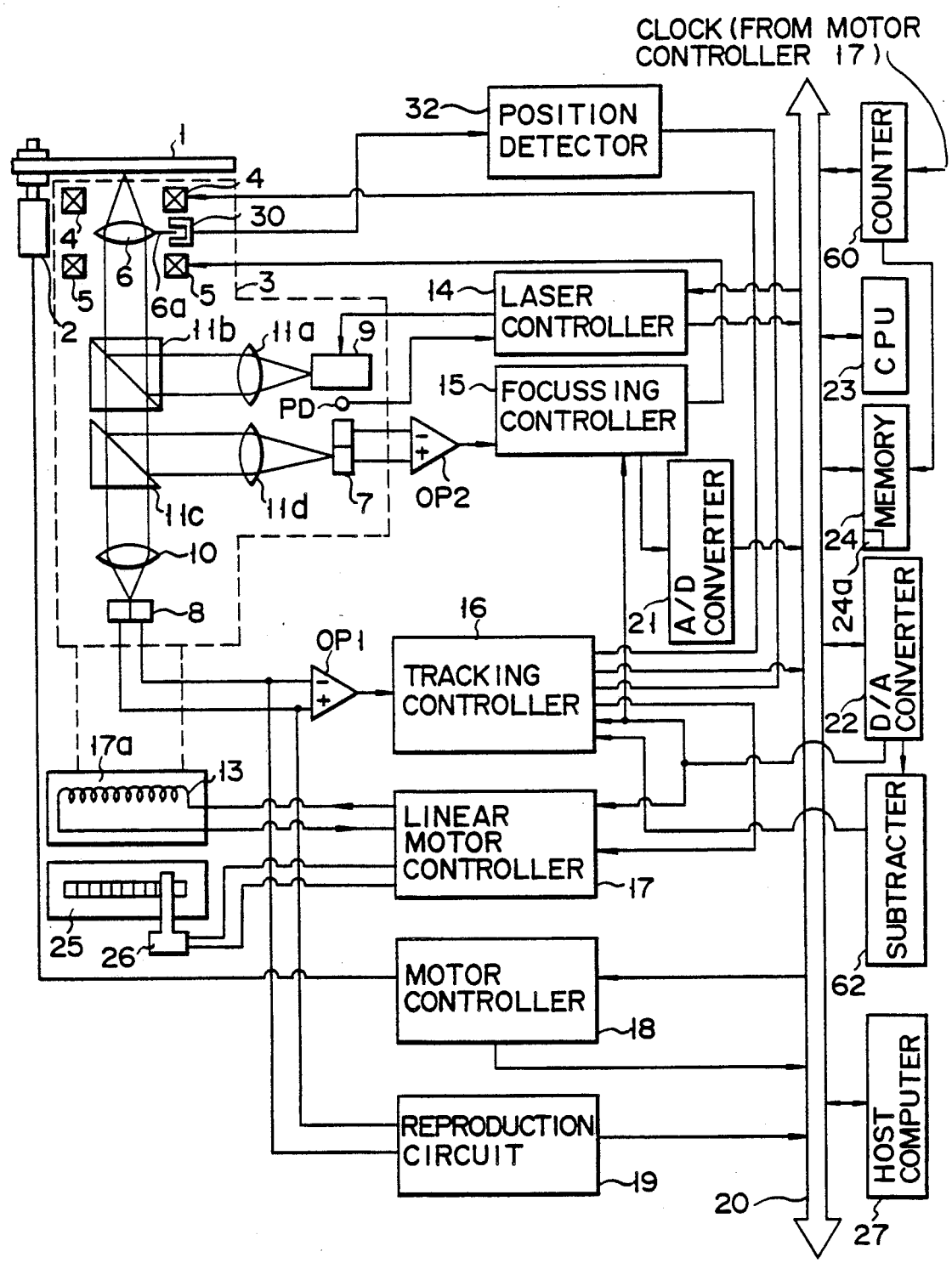
FIG. 6 is a schematic block diagram illustrating an optical disk apparatus according to another embodiment of this invention.
Figure 7:
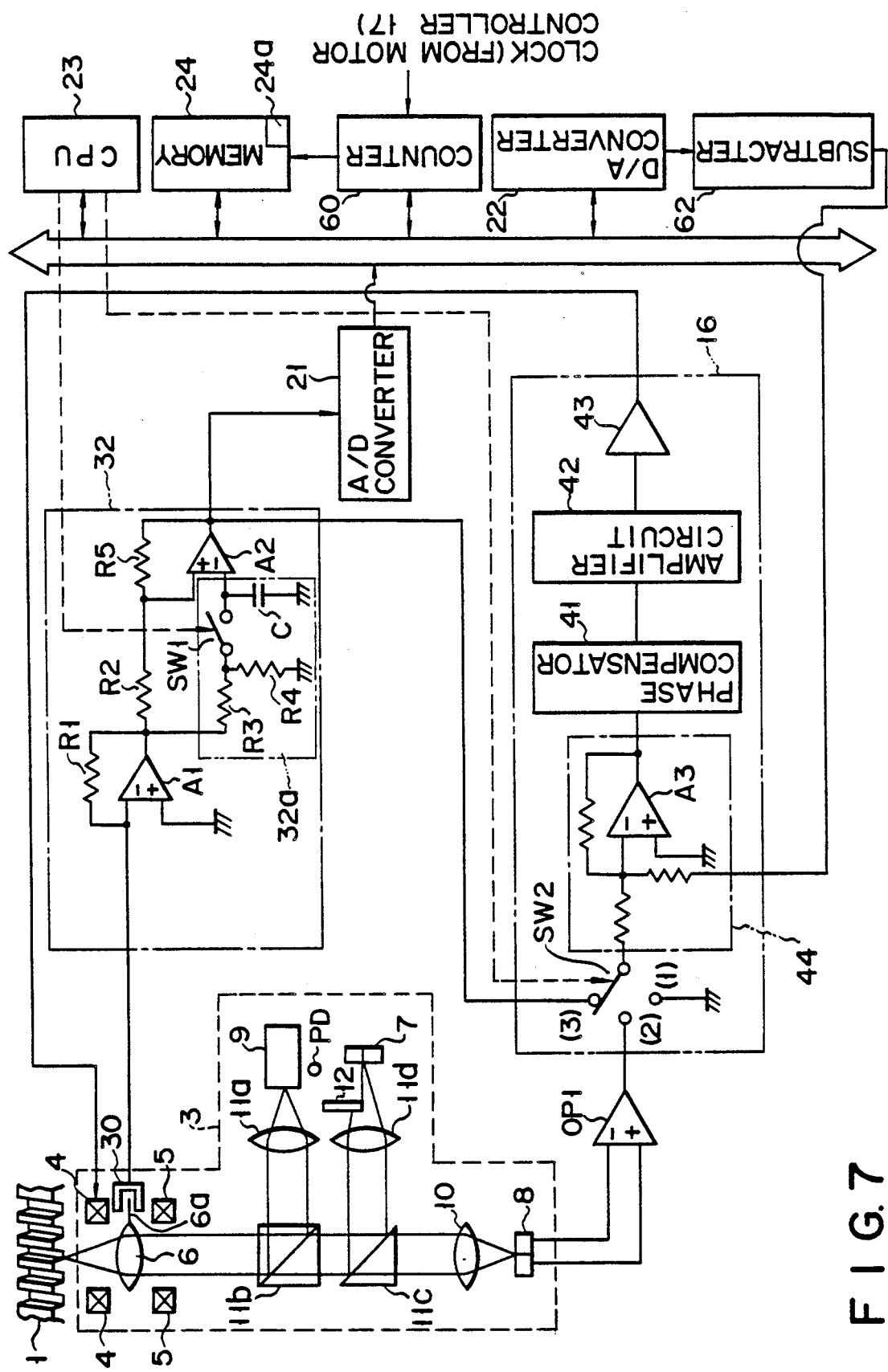
FIG. 7 is a diagram illustrating an essential section for suppressing the swinging of an objective lens in rough access mode according to the second embodiment.

Objective lens 6 is moved in the direction of the arrow C in FIG. 5, i.e., in the direction perpendicular to the optical axis of objective lens 6, by the mutual action of drive coils 4 and permanent magnets provided at fixed sections.

On a side section of objective lens 6 is provided a light-shielding plate 6a that moves with objective lens 6. A sensor 30 is secured to the main body of optical head 3 at a position facing light-shielding plate 6a. This sensor 30 is a photointerrupter type, which is constituted by an LED (light emitting diode) 30a for generate a light beam and a phototransistor 30b for sensing the light beam or a part of the light beam.

Sensor 30 generates an electrical detection signal corresponding to the position of light-shielding plate 6a and the position signal is supplied to a position detector 32. For instance, when objective lens 6 is located in the middle of permanent magnets 52, half of the light beam from LED 30a is shielded by light-shielding plate 6a, and phototransistor 30b outputs an electric signal of a middle level as a consequence. In this manner, phototransistor 30b outputs an electric signal of a level that corresponds to the moved position of objective lens 6.

Referring to FIG. 2, the arrangement of position detector 32 will be described below.

A detection signal from sensor 30 is supplied a current-voltage converter A1 which converts the current signal into a corresponding voltage signal. This voltage is supplied to an RC filter 32a. The output age signal of current-voltage converter A1 is fed back to the inverting input terminal thereof through a resistor R1 and is also supplied to a non-inverting input terminal of a differential amplifier A2 through a resistor R2.

RC filter 32a has resistors R3 and R4, a capacitor C and a change-over switch SW1 located between resistor R4 and capacitor C. This change-over switch SW1 is rendered ON or OFF by a change-over signal from CPU 23; during the ON duration of switch SW1, a voltage signal from current-voltage converter A1 is accumulated in capacitor C, whereas during the OFF duration, a voltage signal immediately before the switch SW1 is rendered OFF is accumulated in capacitor C.

The time constant of RC filter 32a is set sufficiently smaller than the response time for objective lens 6. The output of RC filter 32a is supplied to an inverting input terminal of differential amplifier A2 which outputs a voltage signal corresponding to the difference between the output of differential amplifier A1 and the output of RC filter 32a.

The output of differential amplifier A2 is supplied to tracking controller 16 and fed back to the non-inverting input terminal of differential amplifier A2 through a resistor R5. The aforementioned resistors R1 to R5 have the same resistance.

During the ON duration of change-over switch SW1, differential amplifier A2 has an output signal of level "0" irrespective of the moved position of objective lens 6. The output of current-voltage converter A1 is supplied to capacitor 3 through change-over switch SW1 and resistor R3. Accordingly, the voltage signal corresponding to the moved position of objective lens 6 is accumulated in capacitor C. During the OF duration, the output of current-voltage converter A1 is supplied to the inverting input terminal of differential amplifier A2 through resistor R2. At this time, the voltage signal acquired before the OFF state of change-over switch SW1 is accumulated in capacitor C and this voltage signal is supplied to the non-inverting input terminal of differential amplifier A2.

Accordingly, when objective lens 6 is located in the same position as it was before the switching operation of change-over switch SW1, logic level "0" is output from differential amplifier A2. When objective lens 6 is moved from where it was before the switching operation of change-over switch SW1, differential amplifier A2 outputs a position deviation signal corresponding to the amount of displacement of objective lens 6.

Figure 4:
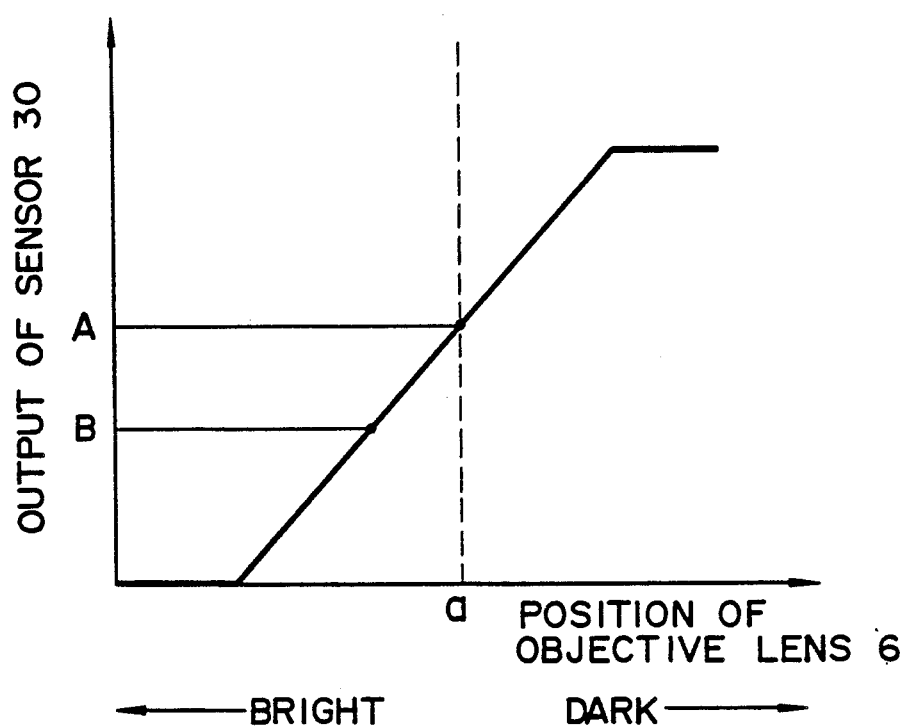
FIG. 4 is a graph illustrating the relation between the position of the objective lens and the detection output of a position, detector both shown in FIG. 1.

FIG. 4 illustrates the sensing characteristic of sensor 30, which represents the detection outputs of sensor 30 with respect to different positions of objective lens 6. When objective lens 6 is located at the center position a, the detection output of sensor 30 is A. An offset error voltage may be added to the detection output of sensor 30 with respect to the center position of objective lens 6. The offset error voltage may be due to reduction in output of sensor 30 with age, a change in the ambient temperature, or the like, and will change the detection output to B. Even in this case, the position deviation signal properly reflects this change to B. Even if an offset error voltage is added to the detection output of sensor 30, the detected content of position detector 32 would not vary and adjustment for the offset is not required.

The optical head 3 is secured to a drive coil 13, which constitutes the movable section of a linear motor 17a, and the drive coil 13 is coupled to a linear motor controller 17. The linear motor controller 17 is coupled with a linear motor position detector 26, which detects an optical scale 25 coupled to optical head 3 and produces a position signal.

The fixed section of the linear motor 17a is provided with a permanent magnet (not shown). Drive coil 13 is excited by linear motor controller 17 so that optical head 3 can move in the radial direction of optical disk 1 with the movement of linear motor 17a.

A laser beam generated by semiconductor laser 9, which is driven by a laser controller 14, is irradiated on optical disk 1 through collimator lens 11a, half prism 11b and objective lens 6. Light reflected from the disk's surface is led to half prism 11c through objective lens 6 and half prism 11b.

One of the beam components split by half prism 11c is led through convergent lens 10 to a pair of track sensors 8. The other beam component is led to the aforementioned focus sensors 7 through convergent lens 11d and knife edge 12.

The output signals of the track sensors 8 are supplied to a differential amplifier OP1 to be converted into a tracking error signal, which is then supplied to a tracking controller 16. The tracking controller 16 sends out the tracking error signal from differential amplifier OP1 to linear motor controller 17. The tracking error signal is also supplied to drive coils 4 for head movement in the tracking direction.

Referring now to FIG. 2, a description will be given of the arrangement of tracking controller 16.

The tracking error signal from differential amplifier OP1 and the position signal from position detector 32 are supplied to a change-over switch SW2. The change-over switch SW2 is switched by a change-over signal from a CPU (control processing unit) 23 to have its movable contact coupled to either a fixed contact (1), (2) or (3). When change-over switch SW2 has its movable contact coupled to fixed contact (1), nothing is output from switch SW2; when the movable contact is coupled to fixed contact (2), the tracking error signal from differential amplifier OP1 is output; and when the movable contact is coupled to fixed contact (3), the position signal from position detector 32 is output. The output of change-over switch SW2 is supplied to a phase compensator 41, which compensates the phase of the received tracking error signal or position signal and outputs the resultant signal to an amplifier circuit 42. Amplifier circuit 42 amplifies the received signal and outputs it to a driver 43, which drives the drive coil 4 in accordance with the received amplified signal.

Tracking controller 16 connects the movable contact of change-over switch SW2 to its fixed contact (2) in accordance with the change-over signal from CPU 23. The tracking error signal from differential amplifier OP1 is supplied to driver 43 through change-over switch SW2, phase compensator 41 and amplifier circuit 42. This driver 43 drives coil 4 to perform tracking control.

Tracking controller 16 also connects the movable contact of change-over switch SW2 to its fixed contact (3) in accordance with the change-over signal from CPU 23. The position signal from position detector 32 is supplied to driver 43 through change-over switch SW2, phase compensator 41 and amplifier circuit 42. Driver 43 drives coil 4 so that objective lens 6 can be held at a predetermined position.

Referring to FIG. 1, focus sensors 7 generates detected signals associated with a focusing state of objective lens 6, which are supplied through differential amplifier OP2 to a focusing controller 15. The output signal of focusing controller 15 is supplied to drive coil 5, so that the position of objective lens 6 is controlled to permit the laser beam to be always on focus on optical disk 1.

A sum signal of the outputs of track sensors 8 in focusing and tracking states represents recorded information data formed as pits on tracks. The sum signal is supplied to a reproduction circuit 19 which reproduces image data and address data (track number, etc.).

The aforementioned laser controller 14, focusing controller 15, tracking controller 16, linear motor controller 17, motor controller 18 and reproduction circuit 19 are all coupled through a bus line 20 to the CPU 23 and controlled by the CPU 23. CPU 23 performs its operation based on a program stored in a memory 24. A target track number or recorded data is transferred onto bus line 20. The bus line 20 is further coupled with a host computer 27 that receives a video signal reproduced from reproduction circuit 19.

An A/D converter 21 is provided to permit data exchange between focusing controller 15 and CPU 23, and a D/A converter 22 is provided to permit data exchange among focusing controller 15, tracking controller 16, linear motor controller 17 and CPU 23.

Referring now to the flowchart shown in FIG. 5, a description will be given of the tracking operation of the above arrangement in coarse access mode. Assume that the movable contact of change-over switch SW2 in tracking controller 16 is coupled to the fixed contact (2) in response to the change-over signal from CPU 23 at the time of data reproduction or recording prior to track accessing.

Then, the tracking error signal from differential amplifier OP1 is supplied to driver 43 through change-over switch SW2, phase compensator 41 and amplifier circuit 42. Driver 43 drives coil 4 in accordance with the tracking error signal for tracking control.

During tracking control, the number of a target track to be accessed is supplied to CPU 23 from an external unit (not shown). CPU 23 compares the present track number with the target track number, and selects the coarse access mode when the difference between these track numbers is more than several tens of tracks.

When the coarse access mode is selected, CPU 23 sends out a scale value corresponding to the target track number to linear motor controller 17 through D/A converter 22. As a result, linear motor controller 17 permits an excitation current to be applied to drive coil 13 in accordance with the scale value. The movement of linear motor 17a causes optical head 3 to move to the position corresponding to the scale value for coarse track accessing.

When optical head 3 starts moving, CPU 23 switches the movable contact of change-over switch SW2 in tracking controller 16 to the fixed contact (3) to stop the tracking. At the same time, CPU 23 renders change-over switch SW1 OFF. Consequently, in accordance with the detection signal from sensor 30, the voltage value of a signal corresponding to the position of objective lens 6 immediately before the track access is executed in coarse access mode is held (accumulated) in capacitor C of position detector 32. Accordingly, the positional locking of objective lens 6 is controlled.

That is, the movable contact of change-over switch SW2 is coupled to the fixed contact (3) by the change-over signal from CPU 23. Consequently, position detector 32 sends out, to tracking controller 16, a deviation signal that represents the difference between the voltage value of the detection signal from sensor 30 and the voltage value accumulated in capacitor C. In accordance with the deviation signal from position detector 32, tracking controller 16 causes driver 43 to drive coil 4 so that objective lens 6 is held at the position where the lens was before the track access in coarse access mode.

When optical head 3 stops moving, or when the track access in coarse access mode is completed, CPU 23 connects the movable contact of change-over switch SW2 to the fixed contact (2). As a result, the tracking error signal from differential amplifier OP1 is supplied to driver 43 through change-over switch SW2, phase compensator 41 and amplifier circuit 42. The driver 43 drives coil 4 in accordance with the tracking error signal to execute tracking control. At this time, change-over switch SW1 is rendered OFF.

Accordingly, even if objective lens 6 suspended by wire suspensions 51 swings due to the reaction of head movement while optical head 3 is moving in coarse access mode, i.e., during acceleration, a low-speed movement or deceleration of optical head 3, objective lens 6 can be held at the position where it was before the track access in coarse access mode.

As described above, the position of objective lens 6 before the track access is executed in coarse access mode, is memorized, and during access, the memorized position is compared with the present position of objective lens 6, and the lens objective 6 is moved in accordance with the difference between the two positions to hold objective lens 6 in the position it was in before the track access began. Therefore, objective lens 6 will not deviate from its position before the track access began.

Accordingly, the swinging of objective lens 6 during coarse access mode is suppressed, the accuracy in coarse accessing is improved, and the position of objective lens 6 relative to optical head 3 is a stable position, which may be at the center between permanent magnets 52, thereby providing stable tracking. In addition, the access time can be shortened.

Tracks on optical disk 1 should ideally form a true circle, but some portions of tracks may be deformed due to radial-directional stretching or compression of optical disk 1. In other words, eccentricity is caused. The amount of eccentricity intrinsic to optical disk 1 is memorized in advance, and objective lens 6 is moved in accordance with the stored eccentricity amount, so that objective lens 6 permits the laser beam to follow a specific track. This following action of the laser beam is eccentric compensation.

Referring now to FIGS. 6 through 10, a description will be given of another embodiment which reflects this eccentric compensation. A description of those sections of this embodiment which are identical with or correspond to the above-described sections of the first embodiment shown in FIGS. 1 through 4, will be omitted.

The output of position detector 32 or the output of differential amplifier A2 is supplied to tracking controller 16 as well as to A/D converter 21.

Tracking controller 16 has an adder 44 provided between change-over switch SW2 and phase compensator 41 to add the tracking error signal from change-over switch SW2 and an eccentric compensation signal from D/A converter 22. This adder 44 is constituted by resistors R6 and R7 and a differential amplifier A3.

A counter 60 is a cycle counter for counting divided signals of a reference clock supplied to motor controller 18. Optical disk 1 has a predetermined sectors, i.e., 256 sectors which are counted by counter 60 during a predetermined period, i.e., one rotation of optical disk 1. Counter 60 counts zero when laser beam is focused on a point on optical disk 1, which can be arbitrarily preset.

A memory 24 is provided with an eccentric compensation table 24a which has eccentric compensation data stored at a memory address corresponding to the count value of counter 60.

Eccentric compensation data of the memory address corresponding to an output value of the cycle counter is set as a subtraction value in a subtracter 62 in coarse access mode, and every time the value of the cycle counter varies to a new one, the subtraction value is subtracted from the eccentric compensation data and the resultant value is output as eccentric compensation data.

A description will be given below of how to register eccentric compensation data in eccentric compensation table 24a. First, optical disk 1 is loaded in the optical disk apparatus and is drive at a given speed by motor 2. Then, optical head 3 is positioned at the innermost track. At this time, the movable contact of change-over switch SW2 in tracking controller 16 is coupled to the fixed contact (2) by the change-over signal from CPU 23. Accordingly, the tracking error signal from differential amplifier OP1 is supplied to driver 43 through change-over switch SW2, adder 44, phase compensator 41 and amplifier circuit 42. Driver 43 drives coil 4 in accordance with the tracking error signal to thereby perform tracking control.

At this time, current-voltage converter A1 in position detector 32 has converted the detection signal from sensor 30 into a corresponding voltage signal and this voltage signal has been accumulated in capacitor C.

Under such a tracking condition, CPU 23 starts the registering of eccentric compensation data. Assuming that the movable contact of change-over switch SW2 in tracking controller 16 is kept coupled to the fixed contact (2) by CPU 23, then the tracking remains ON.

Then, CPU 23 renders change-over switch SW1 OFF. As a result, in accordance with the detection signal from sensor 30, the voltage value of a signal corresponding to the position of objective lens 6 immediately before change-over switch SW1 has been rendered OFF is held (accumulated) in capacitor C.

At this time, position detector 32 sends out, to A/D converter 21, a deviation signal representing the difference between the voltage value of the detection signal from sensor 30 and the voltage value accumulated in capacitor C and a deviation signal is converted into deviation digital data by A/D converter 21.

When the count value of counter 60 is any value "n", the deviation data from A/D converter 21 is stored in a memory address which represents a sum of the base address and offset address "n" indicated by counter 60.

Thereafter, data acquired every time the count value of counter 60 is up-counted is stored in eccentric compensation table 24a for a time corresponding to each revolution of optical disk 1.

The average value of the data acquired every time the count value of counter 60 is up-counted with respect to one revolution of optical disk 1 and the previously stored data is stored in eccentric compensation table 24a.

Consequently, digital values (see FIG. 8) corresponding to deviation signals from position detector 32 for the individual sectors are stored in eccentric compensation table 24a of memory 24. In other words, digital data of the deviation signal produced from position detector 32 while executing tracking control is stored as eccentric compensation data in eccentric compensation table 24a.

In this embodiment, although two revolutions of optical disk 1 are taken as a eccentric sampling period, the eccentric sampling period may be three revolution or more of disk 1.

Further, optical disk 1 may be divided into a plurality of areas in the radial direction, each track consisting of a plurality of tracks, so that eccentric compensation data can be attained for each area.

Figure 10:
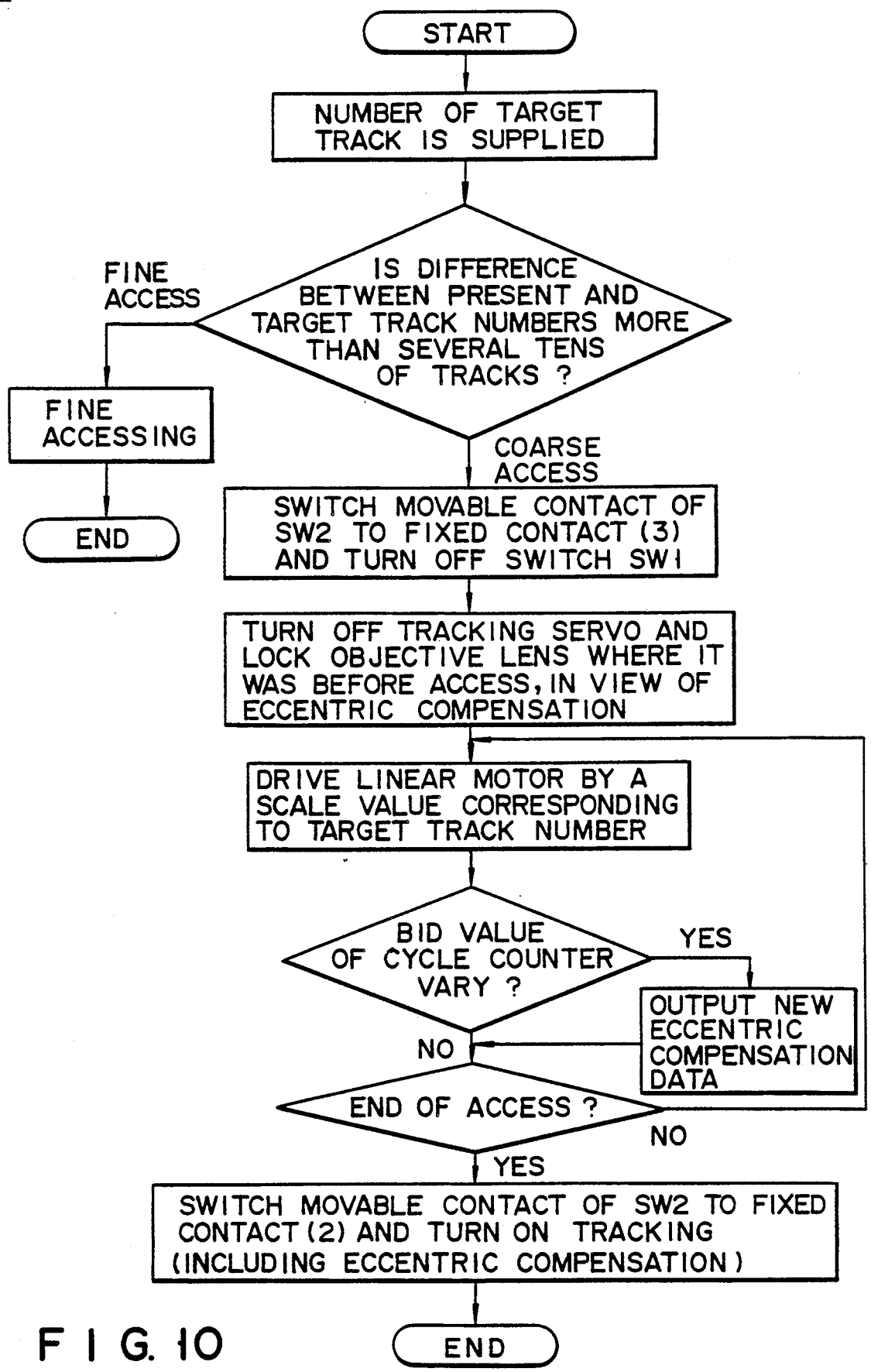
FIG. 10 is a flowchart for explaining the operation of the optical disk apparatus shown in FIG. 6.

Referring now to the flowchart of FIG. 10, a description will be given about the coarse access in mode with the above arrangement.

CPU 23 sends out a scale value corresponding to the target track number to linear motor controller 17 through D/A converter 22. As a result, linear motor controller 17 permits an excitation current to be applied to drive coil 13 in accordance with the scale value. The movement of linear motor 17a causes optical head 3 to move to the position corresponding to the scale value for coarse track accessing.

When optical head 3 starts moving, CPU 23 reads out eccentric compensation data from memory 24 at the memory address corresponding to the count value of counter 60 at that time and this eccentric compensation data is set as a subtraction value in subtracter 62.

Then, CPU 23 switches the movable contact of change-over switch SW2 in tracking controller 16 to the fixed contact (3) to stop the tracking. At the same time, CPU 23 renders change-over switch SW1 OFF. Consequently, in accordance with the detection signal from sensor 30, the voltage value of a signal corresponding to the position of objective lens 6 immediately before the track access is executed in coarse access mode is held (accumulated) in capacitor C of position detector 32. Accordingly, objective lens 6 is held in the position it was in before the track access, in view of the eccentric compensation.

That is, the movable contact of change-over switch SW2 is coupled to the fixed contact (3) by the change-over signal from CPU 23. Consequently, position detector 32 sends out, to tracking controller 16, a deviation signal that represents the difference between the voltage value of the detection signal from sensor 30 and the voltage value accumulated in capacitor C. In accordance with the deviation signal from position detector 32, tracking controller 16 causes driver 43 to drive coil 4 so that objective lens 6 is held at the position where the lens was before the track access in coarse access mode.

When a clock pulse is supplied to counter 60 and the count value is changed as a consequence, CPU 23 sequentially reads out eccentric compensation data from eccentric compensation table 24a in memory 24 at the memory address corresponding to the count value and sends the data to subtracter 62. Subtracter 62 subtracts the subtraction value set therein in advance from the received eccentric compensation data.

The subtraction result from subtracter 62 is converted into analog data in D/A converter and is then supplied to adder 44 in tracking controller 16. Adder 44 in turn adds the tracking error signal and the eccentric compensation signal and sends the resultant signal to driver 43 through phase compensator 41 and amplifier circuit 42. Driver 43 then drives coil 4 in accordance with the tracking error signal and eccentric compensation signal. That is, tracking controller 16 causes driver 43 to drive coil 4 in accordance with the result of adding the deviation signal from position detector 32 and the eccentric compensation data from D/A converter 22, and the eccentric compensation is started from a position immediately preceding a position where objective lens 6 makes access in the coarse access mode.

When optical head 3 stops moving, or when the track access in coarse access mode is completed, CPU 23 connects the movable contact of change-over switch SW2 to the fixed contact (2). The driver 43 drives coil 4 in accordance with the tracking error signal to execute tracking control.

Accordingly, even if objective lens 6, suspended by wire suspensions 51, swings due to the reaction of head movement while optical head 3 is moving in coarse access mode, i.e., during acceleration, a low-speed movement or deceleration of optical head 3, objective lens can be held at the position where it was before the track access in coarse access mode.

Since eccentric compensation for optical disk 1 is also executed, even if the rotation position of the optical disk 1 at the time the track access has started differs from the one at the time the access is completed, the laser beam can be directed by objective lens 6 to the vicinity of the target track with high accuracy due to the eccentric compensation.

As described above, eccentric compensation table 24a containing eccentric compensation data for each sector is provided, the position of objective lens 6 before the track access executed in coarse access mode, is memorized, and during access, the memorized position is compared with the present position of objective lens 6 and the lens 6 is moved in accordance with the difference between two positions and the eccentric compensation data. Accordingly, the eccentric compensation operation is started from that portion immediately preceding a position where objective lens 6 is accessed and continues until the access has been completed. By so doing, access is achieved with consideration paid to the eccentric amount of optical disk 1.

Accordingly, the swinging of objective lens 6 in coarse access mode is suppressed, and the accuracy in coarse accessing is, therefore, improved. At the access terminating time, the relative speed of objective lens 6 relative to optical disk 3 becomes zero, so that stable tracking can be carried out. In addition, the access time can be shortened.

When the rotation position of the optical disk at the beginning of the coarse access mode differs from the sector at the end of this mode, the proper track access can be executed in accordance with a difference in amount of eccentricity for the individual sectors.

In the above embodiments, the voltage value corresponding to the position of the objective lens before track access has been executed in coarse access mode is accumulated in the capacitor of the position detector, so that the voltage value in the capacitor is compared with the voltage value corresponding to the position of the objective lens during access to thereby prevent the objective lens from deviating from where it was before the track access. However, this invention is in no way restricted to the above particular case, but may be modified in various manners within the scope and spirit of the invention. For instance, the output of the sensor that corresponds to the position of the objective lens before the track access may be converted into a digital value in the A/D converter, and this digital value may be compared with the digital value corresponding to the position of the objective lens during access, and the difference between the two digital values may be converted into an analog signal based on which the objective lens can be prevented from deviating from where it was before the track access.

What is claimed is:

1. An optical disk apparatus, comprising:
    an optical head having means for converging a light beam along an axis onto an optical disk which includes tracks spaced from each other in a radial direction, the optical head also having means for detecting a light beam reflected by an optical disk and for detecting a light beam reflected by the optical disk and for outputting a detection signal;
    first driving means for moving the converging means of the optical head in a direction perpendicular to the axis of the light beam;
    second driving means for moving the optical head in the radial direction;
    means, responsive to the detection signal, for generating a tracking error signal which represents a tracking error with reference to a given track of the optical disk;
    means, responsive to the tracking error signal, for actuating the first driving means such that the converging means follows a track of the optical disk;
    means for constantly sensing the actual position of the converging means and for outputting a sensing signal corresponding to the actual position;
    means for producing a predetermined signal used for biasing the second driving means, the second driving means moving the optical head from a given track to a target track in response to the predetermined signal;
    means for storing a value of the sensing signal which the sensing means outputs before the optical head is moved from the given track to the target track while the converging means is in an initial position;
    means for stopping the track following movement of the converging means during an interval when the optical head is being moved from the given track to the target track;
    means for calculating the difference between the sensing signal value stored in the storing means and a value of the sensing signal which the sensing means outputs when the track following movement of the converging means has been stopped;
    means for holding the converging means at the initial position when the optical head is being moved from the given track to the target track in accordance with the difference calculated by the calculating means; and
    means for releasing the converging means from the holding means after the optical head is moved from the given track to the target track, to thereby resume the track following movement of the converging means.

2. An optical disk apparatus according to claim 1, wherein the converging means includes an objective lens.

3. An optical disk apparatus according to claim 1, wherein the detecting means includes a photodetector.

4. An optical disk apparatus for reading and writing information with a light beam on an optical disk having tracks, the apparatus operating in a tracking mode and a coarse accessing mode, the apparatus comprising:
    movable converging means for converging a light beam onto the optical disk;
    tracking detection means, operating while the apparatus is in the tracking mode, for detecting a light beam reflected off the optical disk and for generating tracking error signals;
    position detection means, operating while the apparatus is in the coarse access mode, for detecting the position of the converging means and for generating position signals;
    storing means for storing an initial position signal generated by the position detecting means when the apparatus begins the coarse access mode and the converging means is in an initial position;
    comparing means for comparing the initial position signal to the position signals generated by the position detecting means and for generating vibration error signals, the vibration error signals representing the difference between the initial position of the converging means and the positions of the converging means during the coarse access mode; and
    moving means, responsive to the tracking error signal during the tracking mode and the vibration error signal during the coarse access mode, for moving the converging means, wherein the converging means follows a track on the optical disk during the tracking mode and remains in the initial position during the coarse access mode.

5. An optical disk apparatus according to claim 4, wherein the converging means is an objective lens.

6. An optical disk apparatus according to claim 4, wherein the position detection means includes a photodetector.

* * * * *

UNITED STATES PATENT AND TRADEMARK OFFICE
CERTIFICATE OF CORRECTION

PATENT NO. : 5,003,524
DATED : March 26, 1991
INVENTOR(S) : Hidetoshi Ikeda

It is certified that error appears in the above-identified patent and that said Letters Patent is hereby corrected as shown below:

Claim 1, column 11, line 18, change "an" to --the--.

Claim 1, column 11, lines 19-20, delete "for detecting a light beam reflected by the optical disk and--.

Signed and Sealed this

Sixth Day of April, 1993

Attest:

STEPHEN G. KUNIN

Attesting Officer

Acting Commissioner of Patents and Trademarks